United States Patent [19]

Witt

[11] 4,246,139

[45] Jan. 20, 1981

[54] SILICA PRODUCTION

[75] Inventor: Donald R. Witt, Bartlesville, Okla.

[73] Assignee: Phillips Petroleum Company, Bartlesville, Okla.

[21] Appl. No.: 613,666

[22] Filed: Sep. 15, 1975

Related U.S. Application Data

[63] Continuation-in-part of Ser. No. 349,244, Apr. 9, 1973, abandoned.

[51] Int. Cl.$^3$ ............................................. B01J 21/08
[52] U.S. Cl. ................................ 252/451; 252/454; 252/458; 423/326; 423/339; 526/96; 526/106
[58] Field of Search ................ 526/96, 106; 423/339, 423/326; 252/451, 454, 458

[56] References Cited

U.S. PATENT DOCUMENTS

| | | | |
|---|---|---|---|
| 2,188,007 | 1/1940 | Kistler | 252/6 |
| 2,563,606 | 8/1951 | Kimberlin, Jr. et al. | 252/28 |
| 3,434,912 | 3/1969 | Peri | 161/46 |
| 3,862,104 | 1/1975 | Witt | 260/94.9 D |
| 3,875,079 | 4/1975 | Witt | 252/451 |
| 3,900,457 | 8/1975 | Witt | 260/94.9 D |
| 4,119,569 | 10/1978 | Dietz | 252/454 |

*Primary Examiner*—Paul R. Michl

[57] ABSTRACT

A method of producing silica compositions from hydrogels in which the hydrogel is washed in a first water-soluble organic liquid to remove a principal portion of the water. The washed composition is then washed in at least one second water-soluble organic liquid and the second organic liquid is removed from the composition by venting the second organic liquid from the composition at a temperature above the critical temperature of the second organic liquid to produce a silica composition.

3 Claims, No Drawings

SILICA PRODUCTION

This application is a continuation-in-part application of the application having the Ser. No. 349,244, filed Apr. 9, 1973 now abandoned.

This invention relates to silica production.

This invention relates to a silica-containing catalyst support. In another aspect this invention relates to a catalyst comprising chromium on a silica-containing support that is especially usable in the particle-form polymerization of olefins. In another aspect this invention relates to the particle-form polymerization of olefins.

In one of its more specific aspects, this invention relates to the production of a silica particularly suitable for employment as a catalyst substrate in ethylene polymerization.

The production of ethylene polymers by procedures such as those described in U.S. Pat. Nos. 2,825,721 and 3,225,023 is well known. Generally, these procedures, to which the present invention pertains, and the disclosures of which patents are incorporated by reference, teach ethylene polymerization employing chromium on a silica substrate, the composite of chromium and silica having been activated at elevated temperatures to produce a catalyst.

Supported chromium-containing catalysts can be used to prepare olefin polymers in a hydrocarbon solution to give a product having excellent characteristics from many standpoints. Supported chromium-containing catalysts can also be used to prepare olefin polymers in a slurry system wherein the polymer is produced in the form of small particles of solid materials suspended in the diluent. This process, frequently referred to as a particle-form process, has the advantage of being less complex. However, there is less leeway in controlling the ultimate properties of the polymer produced when using the particle-form process. For instance, in the solution process the molecular weight of the polymer can be controlled by simply varying the temperature, with lower molecular weight (high melt flow) polymer being produced at the higher temperature. It is readily apparent that this type of control of molecular weight is limited in the particle-form process since substantial increases in temperature can cause the polymer to go into solution. A limiting factor in reaching high melt index in the slurry process is the catalyst.

It is an object of this invention to produce a silica catalyst support which can be used in a particle-form process to produce high melt index polyolefins.

It is also an object of this invention to provide a particle-form olefin polymerization process that will yield high melt index polymers.

A further object of this invention is the provision of a chromium-containing silica support useful in particle-form olefin polymerization.

The present invention relates to the preparation of the silica substrate and in one embodiment to the separation of the water from the hydrogel in which form the silica is produced upon reaction of an alkali metal silicate with a mineral acid. Accordingly, the present invention is employable to separate the water from the hydrogel to produce a silica composition regardless of the method employed to produce the hydrogel or the treatment of the hydrogel prior to the separation of the water therefrom.

Similarly, the method of this invention is applicable to produce a silica composition regardless of its subsequent usage, such usage frequently involving impregnation with a chromium-containing compound to form a composite which is activated at elevated temperatures to form a catalyst active for olefin polymerization.

According to one embodiment of the present invention, water is separated from a hydrogel to produce a dried silica composition by contacting the hydrogel with a first substantially water-free, organic compound soluble in water and separating the silica hydrogel from the liquid to remove a major portion of the water from the silica composition. The first organic compound can be employed in any number of contacts with the hydrogel and it can be removed from the hydrogel in any suitable manner. Removal by draining from the silica composition is usually sufficient. The thus-contacted hydrogel can be termed an organogel since most of the aqueous liquid has been replaced. The composition is then contacted with at least one second substantially water-free, organic compound soluble in the first organic compound and in water to form a mixture. The mixture is then heated to a temperature at least equal to the critical temperature of the second organic compound in a closed zone without any loss of volatile components. The pressure on the mixture is then reduced and the second organic compound and water, with the first organic compound if present in minor amounts, are vaporized from the silica composition to produce the dried silica composition.

Suitable first organic compounds include methanol, ethanol, ethyl acetate, ethyl ether, and the like.

Suitable organic compounds for the second or subsequent washings include the aforementioned compounds, it being understood that unlike compounds are used as the first and second organic compound. Mixtures of the above compounds can also be used.

The second organic compound can be employed in any number of contacts with the hydrogel. Similarly, it can, in the preliminary washings, be removed in any suitable manner from the silica. After the final washing, the second organic compound will be removed from the silica at a temperature at least equal to the critical temperature of the second organic compound.

It is to be understood that the invention employs at least two washings with organic compounds, but more than two washings can be employed.

All washings of the silica can be carried out in any suitable manner and the organic compounds can be used in any quantity. It is only necessary that a principal portion of the water be removed from the silica by the first organic compound and that the amount of water remaining with the silica after contact with the second organic compound be removable by the subsequent heating step to remove the second organic compound.

Generally the support of this invention is prepared by employing a silica hydrogel which is substantially free of ions which will interfere with its activity when employed in particle-form polymerization. To obtain from this purified hydrogel a support which can be employed in the particle-form process to form a high melt index polyolefin, the hydrogel is contacted with a first substantially water-free contact liquid comprising at least one water-soluble organic liquid to remove a major portion of the water in the silica composition. The contacted hydrogel and the liquid not contained within the contacted hydrogel are separated by pouring off the excess liquid and the thus-contacted hydrogel is then contacted with a second substantially water-free contact liquid comprising at least one organic liquid different from those employed previously preferably having a lower boiling point than the first organic contact liquid and soluble in the previous organic contact liquid and in water. Then the remaining liquid in the gel is removed by heating the gel in a confined vessel in such a manner that no substantial vaporization of the liquid occurs until the critical temperature of the last contact liquid is reached. For example, the liquid impregnated gel can be placed under a nigrogen pressure in a pressure vessel. After the aforementioned critical temperature is reached, the vapors are then carefully allowed to escape.

The venting is conducted at such a rate that reduction in the porosity of the gel is minimized. The satisfactory rate of venting can be determined by routine experimentation. Of course the venting must not be allowed to proceed at such a rate that the silica composition will be expelled from the vessel along with the vapors.

This invention is applicable to any of the silica-containing catalyst supports prepared from a hydrogel. Thus, silica-alumina cogels, silica-titania cogels, silica-zirconia cogels, silica-magnesia cogels, silica-titania-chromia tergels and the like are within the scope of this invention. Generally, the silica constitutes a substantial portion of the support with other metal compounds, when used, making up from about 0.1 to about 20 weight percent of the finished support.

In the best mode of practicing the invention, sodium silicate is introduced into sulfuric acid to form a hydrogel, a titanium-containing compound being included in the acid. Preferably the hydrogel is aged at room temperature for about 1 hour, washed substantially free of sodium and then dried in the manner described in the preceding paragraphs. The titanium content of the preferred dried gel ranges from about 0.5 to about 10 weight percent, preferably from about 1 to about 8 weight percent based on the total weight of the support and the titanium compound.

In one embodiment the hydrogel is aged and is then subjected to the method of this invention employing a plurality of washings with methanol as the first organic compound and a plurality of washings with ethyl ether as the second organic compound. The ethyl ether and water are removed at a temperature not less than the critical temperature of the ethyl ether to produce a silica composition which is recovered.

The silica composition can then be impregnated with t-butyl chromate and the silica containing the titanium and chromium can be activated at a temperature of about 1600° F. to produce a silica composition containing about 2 percent titanium and 1 percent chromium and active in olefin polymerization.

Generally according to this invention the silica support is impregnated with chromium to form a suitable catalyst for the particle-form polymerization of olefins. The chromium is added to the support by one of three methods. The chromium can be added by treating the hydrogel with an aqueous solution of a chromium oxide or a material which can be oxidized to an oxide of chromium. For example, the hydrogel can be treated with an aqueous solution of chromium trioxide, chromium nitrate, chromium acetate, or the like. The necessary chromium can also be added by impregnating the finally dried gel with a water-free organic chromium compound capable of being oxidized to a chromium oxide. For instance, a hydrocarbon solution of tertiary butyl chromate can be used. The third alternative is that a solid chromium compound can be mixed with the finally dried silica support. The term "finally dried silica support" used above refers to the support resulting after the above-described critical temperature flash-drying technique.

The amount of chromium compound usually employed in the catalyst for particle-form olefin polymerization is such that about 0.1 to about 10 weight percent of the final catalyst is chromium calculated as the metal. Preferably about 0.5 to about 5 weight percent of the catalyst is chromium.

The resulting dried silica-supported chromium is then calcined using techniques known in the art. Generally the calcination involves heating the support to a temperature in the range of 800° to 2000° F. (426°–1093° C.), preferably 900° to 1700° F. (482°–927° C.), for a time within the range of $\frac{1}{2}$ to 50 hours, preferably 1 to 10 hours, in an oxygen-containing atmosphere, for example, dry air. Generally it is preferred to carry out the calcination using a stream of fluidized air which is continued as the material cools. The cooled material is then used in the particle-form polymerization process in the same manner as the prior art silica-supported chromium catalysts.

The polymers usually prepared by such a particle-form process are solid homopolymers of ethylene or copolymers of ethylene with at least one other mono-1-olefin containing 3 to 8 carbon atoms per molecule. Exemplary copolymers include ethylene/propylene, ethylene/1-butene, ethylene/1-hexene, ethylene/1-octene, and the like. The major portion of such copolymers is derived from ethylene and generally comprises at least about 80 mole percent, preferably at least about 95 mole percent of ethylene-derived units. These copolymers are well suited for extrusion, blow molding, injection molding, and the like.

Reference to the production of polyolefins via a particle-form process is found in U.S. Pat. No. 3,624,063, the disclosure of which is incorporated herein by reference.

The particle-form process in which the catalyst of this present invention is particularly applicable is a process in which the catalyst is maintained in suspension and is contacted with the olefin or mixture of olefins in an organic at pressures sufficient to maintain the medium and at least a portion of the olefins in the liquid phase. The medium and temperature are such that the polymer produced is insoluble in the medium and is recovered in the form of solid particles. Generally temperatures within the range of about 150°–230° F. (66°–110° C.) are satisfactory. The organic medium (diluent) is generally a paraffin and/or cycloparaffin having from 3 to 12 carbon atoms per molecule. Representative examples include propane, butane, isobutane, pentane, isopentane, cyclohexane, n-dodecane, methylcyclohexane, and the like. Pressures can range from about 100 to 700 psig or higher, and catalyst concentrations can range from 0.001 to about 10 weight percent based on the weight of the reactor contents.

For use in the particle-form polymerization the catalyst is employed in a particle size that is compatible with the polymerization process. Catalyst particles in the range of about 50 to 350 mesh are generally satisfactory.

The method of this invention is demonstrated by the following runs in which a solution of sodium silicate was introduced with stirring into a solution of sulfuric acid containing dissolved titanyl sulfate to form a hydrogel cogel at 70° F. (21° C.) and a pH of 6.8. The hydrogel was aged 4 hours at 170° F. (77° C.). The aged hydrogel was washed several times with an aqueous solution of ammonium nitrate (1 weight percent salt) to lower the sodium content below 0.1 weight percent and finally several times with deionized water. The titanium content (dry basis) was 2.5 weight percent. The purified gel was then divided into four portions which were treated as follows:

Portion 1 was washed 12 times with ethyl acetate. The silica was drained of the last washing and the residual ethyl acetate was removed from the drained gel by heating the gel in a confined vessel under pressure such that no substantial vaporization of the liquid was allowed to occur until the critical temperature of the ethyl acetate was reached, that is, a temperature of 482.7° C. (250.4° C.). After a temperature within the range of 512°–565° F. (267°–296° C.) was reached the vapors were then carefully vented and the dried gel recovered. Inasmuch as a single organic wash compound was employed, this method does not represent the method of the invention.

Portion 2 was washed several times with ethyl acetate, and then the residual ethyl acetate and water were removed from the silica by azeotropic distillation and the dried gel recovered. This method does not represent the method of the invention.

Portion 3 was washed 9 times with methanol. This portion was then washed 3 times with absolute ethanol. The portion was then washed 5 times with diethyl ether. The residual diethyl ether was then removed from the gel by heating the gel in a vessel under a pressure such that no substantial vaporization occurred until the critical temperature of the diethyl ether was reached, that is, a temperature of 378.7° F. (192.6° C.). After a temperature within the range of 415°–430° F. (213°–221° C.) was reached the vapors were carefully vented and the dried gel was recovered. This method does represent the method of the invention.

Portion 4 was washed in the manner described for Portion 3. The diethyl ether was removed by distillation at atmospheric pressure and the dried gel was recovered. This method does not represent the method of the invention since the gel was not dried using the critical temperature flash-drying technique.

Each of the dried gels was then individually impregnated with tertiary butyl chromate to give 1 weight percent chromium calculated as the metal based on the dry composite and activated by calcination. Activation was conducted in a fluidized bed for 5 hours at 1600° F. (871° C.). Each was then individually employed in ethylene polymerization under substantially identical conditions to produce an ethylene homopolymer in a particle-form process.

Each homopolymer was prepared in a stirred, 2-liter, stainless steel reactor flushed with dry nitrogen at about 215° F. (102° C.) to remove any water and oxygen in individual runs by first charging the reactor with 1¼ lbs. (57 g) of isobutane and about 0.05 g catalyst. The reactor and its contents were then raised to 230° F. (110° C.), pressured to 550 psig (3792 KPa gage) with ethylene and the run commenced. Ethylene was supplied on demand to maintain the stated pressure as the run progressed. The amount of catalyst charged and the results obtained are presented in the following table. Each run length was of sufficient duration (48–77 minutes range) to produce polymer equivalent to about 5000 gms./gm. of catalyst.

In the following table run 1 employed the catalyst prepared from Portion 1 of the hydrogel, as described above. Run 2 employed the catalyst prepared from portion 2. Run 3 employed the catalyst prepared from Portion 3 and run 4 employed the catalyst prepared from Portion 4.

| Run No. | Catalyst Charged, g | Productivity g polymer/g Catalyst | Polymer Properties | | |
|---|---|---|---|---|---|
| | | | Melt Index | | HLMI[2] MI |
| | | | As Determined | Adjusted[1] | |
| I | 0.0516 | 5060 | 3.6 | 3.6 | 39.4 |
| II | .0527 | 4780 | 3.9 | 3.7 | 42.2 |
| III | .0488 | 4960 | 6.3 | 6.2 | 37.6 |
| IV | .0501 | 4565 | 5.8 | 5.3 | 40.0 |

[1] It is recognized that a correlation exists between productivity and melt index. For a meaningful comparison, each melt index value is adjusted to the 5000 g polymer per g catalyst level by employing the following formula: $MI_{(adjusted)} = MI_{(measured)}[1 + (productivity - 5000) \times 2 \times 10^{-4}]$

[2] The ratio HLMI (high load melt index, ASTM D1238-62T, Condition F) to MI (melt index) is considered by those skilled in the art to be a measure of the molecular weight distribution of the polymer. The lower the number, the narrower the molecular weight distribution.

It will be seen that Run III, in which the method of the invention was employed to prepare the silica-titania cogel support, produced a polymer having the highest melt index. The HLMI/MI values are about the same and indicate a similar molecular weight distribution for all four polymers.

These data distinguish the method of this invention from that method illustrated by Portion 1 in which a single organic compound is employed to wash the hydrogel, the single organic compound being removed at a temperature above its critical temperature. It is also seen from the above data that the method of this invention produces silica support superior in terms of the polymer which it is employed to produce to that polymer produced by removal of the organic compound by distillation, in either the use of a single organic compound as in Portion 2 or in the use of three different organic compounds as in Portion 4.

It will be evident from the foregoing that various modifications can be made to the method of this invention. Such are considered, however, to be within the scope of the invention.

That which is claimed is:

1. A method of preparing a silica-containing composition comprising:
   (a) forming a silica-titanium hydrogel by adding a solution of sodium silicate to a solution of sulfuric acid containing titanyl sulfate;
   (b) aging the hydrogel;
   (c) removing substantially all of the sodium ions from said hydrogel to produce a purified hydrogel;
   (d) contacting said purified hydrogel with a plurality of contacts with methanol and then with a plurality of contacts with ethanol to displace a major portion of the water in the hydrogel thereby resulting in an organogel;
   (e) separating the organogel from the liquid not contained therein;
   (f) then contacting the thus separated organogel with a plurality of contacts with diethyl ether;
   (g) then removing the liquid remaining in the organogel by heating said organogel in a confined zero in such a manner that no substantial vaporization occurs until the critical temperature of the diethyl ether is reached; and (h) then venting the vapors from said confined zone at such a rate that the reduction in the porosity of the organogel is minimized to produce a dried gel.

2. A method according to claim 1 wherein the solution of sulfuric acid contains enough titanyl sulfate to insure that the dried gel will contain from about 0.5 to about 10 weight percent titanium.

3. A method according to claim 1 wherein subtantial vaporization of the liquid remaining in the gel during the heating step is prevented by placing the confined zone containing the gel under sufficient pressure of an inert gas.

* * * * *